United States Patent [19]

Träubel et al.

[11] Patent Number: 5,556,935

[45] Date of Patent: Sep. 17, 1996

[54] CROSSLINKING AGENTS FOR TEXTILE PRINTING BINDERS

[75] Inventors: Harro Träubel; Herbert Wigger, both of Leverkusen; Hans-Josef Laas, Cologne; Helmut Reiff, Leverkusen, all of Germany

[73] Assignee: Bayer Aktiengesellschaft, Leverkusen, Germany

[21] Appl. No.: 440,286

[22] Filed: May 12, 1995

Related U.S. Application Data

[63] Continuation of Ser. No. 241,926, May 12, 1994, abandoned, which is a continuation of Ser. No. 66,454, May 24, 1993, abandoned.

[30] Foreign Application Priority Data

May 29, 1992 [DE] Germany .......................... 42 17 716.2

[51] Int. Cl.$^6$ .................................................. C08G 59/00
[52] U.S. Cl. .................... 528/99; 528/48; 528/49; 528/50; 528/52; 528/86; 528/87; 528/88; 524/589; 524/590
[58] Field of Search .............................. 528/99, 48, 49.5, 528/52.86, 87.88; 524/589, 590

[56] References Cited

U.S. PATENT DOCUMENTS

| | | | |
|---|---|---|---|
| 4,433,095 | 2/1984 | Hombach et al. | 524/563 |
| 4,849,262 | 7/1989 | Uhl et al. | 427/288 |
| 4,910,339 | 3/1990 | Henning et al. | 564/252 |
| 5,087,646 | 2/1992 | Tork et al. | 523/406 |

FOREIGN PATENT DOCUMENTS

| | | |
|---|---|---|
| 3109978 | 1/1982 | Germany . |
| 3836030 | 5/1990 | Germany . |
| 962109 | 6/1964 | United Kingdom . |

OTHER PUBLICATIONS

W. Berlenbach in Ullmanns Encyklopädie der technischen Chemie, 4th Edition, vol. 22, p. 629, Verlag Chemie, Weinheim 1982.

Database WPIL Nr. 82–45 491.

Database WPIL Nr. 92–068 177.

Database WPIL Nr. 87–324 984.

*Primary Examiner*—James J. Seidleck
*Assistant Examiner*—Duc Truong
*Attorney, Agent, or Firm*—Joseph C. Gil; Richard E. L. Henderson

[57] ABSTRACT

The present invention relates to textile printing pastes containing modified polyisocyanates, modified polycarbodiimides, or trifunctional polyepoxides as crosslinking agents for the binders present therein.

3 Claims, No Drawings

CROSSLINKING AGENTS FOR TEXTILE PRINTING BINDERS

This application is a continuation of application Ser. No. 08/241,926, filed May 12, 1994, now abandoned which is a continuation of Ser. No. 08/066,454 filed May 24, 1993 now abandoned.

BACKGROUND OF THE INVENTION

This invention relates to the use of modified polyisocyanates as crosslinking agents for binders used in textile printing pastes.

Non-self-crosslinking film-forming binders, for example, those based on polyacrylates or butadiene/acrylonitrile copolymers, are widely used in the textile printing industry. The mixtures of binder and pigment normality contain additionally reactive compounds which, after printing, crosslink the binder at a relatively high temperature and are thus able to fix the print. It is only this fixing that leads to the required water resistance that is important, for example, in washing the printed textiles. (The term "pigments" in the context of the invention also includes dyes.)

In practice, melamine/formaldehyde condensates which enter into crosslinking reactions only at temperatures above about 120° C. are most commonly used as crosslinking agents for the binders used in textile printing pastes. According to W. Berlenbach in *Ullmanns Encyklopädie der technischen Chemie,* 4th Edition, Vol. 22, page 629, Verlag Chemie, Weinheim 1982, crosslinking is catalyzed by acids via N-methylol groups in the binder. The print is best fixed by exposure to dry hot air, for example, for 5 to 10 minutes at 140° C. or for 30 to 60 seconds at 175° C.

German Offenlegungsschrift 3,529,530 proposes textile printing pastes that contain separately crosslinkable binders dispersed in water or in organic solvents and "deactivated" (i.e. partly blocked) polyisocyanates as crosslinking agents.

German Offenlegungsschrift 3,109,978 describes water-based textile printing pastes that contain film-forming separately crosslinkable polymers as binders and isocyanate prepolymers as crosslinking agents. By comparison with low molecular weight polyisocyanates, these prepolymers apparently provide the printing pastes with a longer pot life by virtue of their higher molecular weights and their lower content of reactive groups.

German Offenlegungsschrift 3,836,030 describes coating compositions that are suitable for the preparation of coatings permeable to water vapor on leather and textiles by the method of evaporation coagulation. In addition to thickeners, these coating compositions contain carboxylate- and/or sulfonate- and/or polyethylene oxide-modified (and hence "hydrophilicized") polyurethanes in aqueous dispersion, high-boiling organic solvents as "non-solvents" for the polyurethanes dispersed in water, NCO-free crosslinking agents, and hydrophilic polyisocyanates to promote coupling with the substrate and as crosslinking agents for the dispersed polyurethanes. During the evaporation process, the non-solvent leaves micropores in the polyurethane film remaining behind and thus guarantees the desired permeability of the coating to water vapor.

German Offenlegungsschrift 3,512,918 relates to hydrophilic isocyanate derivatives containing carbodiimide groups and to their use as crosslinking agents for polymers present in aqueous solution or dispersion that are said to be suitable inter alia for the coating of textiles. Printing pastes are not mentioned.

British Patent 962,109 discloses coating compositions based on special copolymers that are crosslinked with diepoxides. The disclosed compositions may also be used for the preparation of printing pastes. However, the printing pastes in question are not entirely satisfactory in regard to the reactivity and fastness values of prints produced using them.

The disclosed textile printing pastes of the prior art are attended by various disadvantages. Either formaldehyde is given off during the crosslinking reaction and also subsequently in the use of the printed textiles, which is particularly undesirable, or the number of reactive groups available for the crosslinking reaction is difficult to control or the crosslinking agent can be dispersed only with some effort. In addition, known printing pastes generally do not give satisfactory fastness values when heat-treated at temperatures below 100° C. Accordingly, the problem addressed by the present invention was to provide textile printing pastes which would not have any of these disadvantages.

It has now surprisingly been found that this problem can be solved by the use of special mixtures of hydrophilicized polyisocyanates, which give prints having excellent fastness values.

SUMMARY OF THE INVENTION

Accordingly, the present invention relates to a textile printing paste comprising a pigment, a binder, and a crosslinking agent, wherein said crosslinking agent is I) a polyisocyanate mixture prepared by reaction at an NCO:OH equivalent ratio of at least 2:1 of (A) a polyisocyanate component having an (average) NCO functionality of 2.1 to 4.4 in which at least one polyisocyanate of said polyisocyanate component contains only (cyclo)aliphatically bound isocyanate groups with (B) a polyalkylene oxide polyether alcohol containing a statistical average of 5 to 70 ethylene oxide units, wherein said polyisocyanate mixture (I) has
   (i) an average NCO functionality of 1.8 to 4.2,
   (ii) a content of (cyclo)aliphatically bound isocyanate groups (expressed as NCO, molecular weight 42) in the range from 12.0 to 21.5% by weight, and
   (iii) a content of ethylene oxide units (expressed as $C_2H_4O$, molecular weight 44) arranged within polyether
chains of 2 to 20% by weight; or
   II) an isocyanate derivative prepared from an organic polyisocyanate having an (average) NCO functionality of 2.0 to 2.5 or a mixture of organic poly- and monoisocyanates having an average NCO functionality of 1.3 to 2.5 and, optionally, compounds containing isocyanate-reactive groups, wherein said isocyanate derivative contains
   (i) 2 to 30% by weight (preferably 5 to 15% by weight) of carbodiimide groups —N=C=N—, with the statistical average being 0.8 to 30 (preferably 1 to 25 and more preferably 1.2 to 20) —N=C=N— groups per molecule,
   (ii) 5 to 200 (preferably 5 to 150 and more preferably 5 to 120) milliequivalents of chemically incorporated sulfonate groups per 100 g of isocyanate derivatives (II), and
   (iii) optionally (and preferably), 0 to 25% by weight (preferably 0 to 20% by weight and more preferably 0 to 15% by weight), based on isocyanate derivatives (II), of chemically incorporated ethylene oxide units —CH$_2$—CH$_2$—O— positioned within polyether chains; or III) bisglycidyl-2,2-diphenylpropane or a polyepoxide containing at least three epoxide groups per molecule.

The present invention further relates to a method comprising printing a textile with said textile printing paste.

DETAILED DESCRIPTION OF THE INVENTION

The polyisocyanate mixtures (I) to be used in accordance with the invention generally have a viscosity of 50 to 10,000 mPa•s at 23° C. These polyisocyanate mixtures can be prepared in known manner by reaction of a polyisocyanate component (A) having an (average) NCO functionality of 2.1 to 4.4 (preferably 2.3 to 4.3) and comprising at least one polyisocyanate containing only (cyclo)aliphatically bound isocyanate groups with a monohydric or polyhydric polyalkylene oxide polyether alcohol (B) containing a statistical average of 5 to 70 ethylene oxide units, an NCO:OH equivalent ratio of at least 2:1 (generally 4:1 to approximately 100:1) being maintained during the reaction and the type and quantities of the starting components mentioned being selected so that the resulting reaction products correspond to the conditions mentioned above under (I)(i) to (I)(iii).

Polyisocyanate component (A) encompasses uretdione, isocyanurate, urethane allophanate, biuret, and/or oxadiazine polyisocyanates produced by modification of simple (cyclo)aliphatic diisocyanates, such as are described, for example, in German Offenlegungsschriften 1,670,666, 3,700,209, and 3,900,053 or in European Patent Applications 336,205 and 39,396. Polyisocyanate components (A) containing less than 1% by weight (preferably less than 0.5% by weight) monomeric isocyanate are particularly preferred.

Suitable diisocyanates for the preparation of these polyisocyanates (A) are, basically, those having a molecular weight in the range from 140 to 400 and containing (cyclo)aliphatically bound isocyanate groups, such as 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethylcyclohexane (i.e., isophorone diisocyanate) and 4,4'-diisocyanatodicyclohexylmethane or mixtures of these diisocyanates.

The polyisocyanate component (A) is preferably an isocyanurate-modified and, optionally, uretdione-modified polyisocyanate mixture consisting essentially of trimeric 1,6-diisocyanatohexane and, optionally, dimeric 1,6-diisocyanatohexane with an NCO content of 19 to 24% by weight. In a particularly preferred embodiment, component (A) is selected from the corresponding isocyanurate-modified polyisocyanates with the same NCO content, but substantially free from uretdione groups, that are obtained in known manner by catalytic trimerization of 1,6-diisocyanatohexane with isocyanurate formation and which preferably have an (average) NCO functionality of 3.2 to 4.2.

Component (B) is selected from monohydric or polyhydric polyalkylene oxide polyether alcohols which, on a statistical average, contain 5 to 70 (preferably 6 to 60) ethylene oxide units per molecule and which can be obtained in known manner by alkoxylation of suitable starter molecules. The starter molecules used for the preparation of the polyether alcohols (B) may be any monohydric or polyhydric alcohols having a molecular weight in the range from 32 to 150, the use of which is described, for example, in European Patent Application 205,059. Preferred starter molecules are mono-functional aliphatic alcohols containing 1 to 4 carbon atoms, with methanol, ethanol, propanol, and butanol being particularly preferred. Alkylene oxides suitable for the alkoxylation reaction are preferably ethylene oxide and propylene oxide, which may be used in any order or even in admixture in the alkoxylation reaction.

The polyalkylene oxide polyether alcohols (B) are either pure polyethylene oxide polyethers or mixed polyalkylene oxide polyethers that contain at least one polyether chain containing at least 5 (generally 5 to 70, preferably 6 to 60 and, more preferably, 7 to 20) ethylene oxide units and in which at least 60 mol-% (preferably at least 70 mol-%) of the alkylene oxide units are ethylene oxide units.

Preferred polyether alcohols (B) for the preparation of the polyisocyanate mixtures to be used in accordance with the invention are monofunctional polyalkylene oxide polyethers containing a statistical average of 6 to 60 ethylene oxide units that have been initiated with an aliphatic alcohol containing from 1 to 4 carbon atoms. Particularly preferred polyether alcohols (B) are pure polyethylene glycol monomethyl ether alcohols containing a statistical average of 7 to 20 ethylene oxide units.

Instead of the preferably nonionically/hydrophilically modified polyisocyanates described above, unmodified polyisocyanates of the type mentioned above by way of example as component (A) may also be used as the source of all or part of the (cyclo)aliphatically bound isocyanate groups described in (I)(ii), with the proviso that the polyisocyanates are used in combination with suitable emulsifiers, for example, those described, European Patent Application 13,112 for the hydrophilicization of aromatic polyisocyanates.

Suitable binders which may be crosslinked with the polyisocyanate mixtures to be used in accordance with the invention include, for example, polymers such as polymers based on natural or synthetic rubber, styrene/butadiene copolymers, polymers of 2-chlorobutadiene, styrene/acrylonitrile copolymers, polyethylene, chlorosulfonated or chlorinated polyethylene, butadiene/acrylonitrile copolymers, butadiene/methacrylate copolymers, polyacrylates, PVC or optionally partly saponified ethylene/vinyl acetate copolymers, or polyaddition compounds, such as those based on polyurethanes, that is, products of the type described, for example, in *Ullmanns Encyklopäidie der technischen Chemie*, 4th Edition, Vol. 16, Verlag Chemie, Weinheim/New York 1978, pages 159 et seq. and the literature references cited therein or in German Offenlegungsschriften 1,953,345, 1,953,348, or 1,953,349 or in U.S. Pat. No. 2,939,013.

The crosslinking agent to be used in accordance with the invention is generally used in a quantity of 1 to 25 parts by weight (preferably 2.5 to 12.5 parts by weight) per 100 parts by weight of binder. This selection of the quantity of crosslinking agent presupposes that the binder contains at least the number of NCO-reactive groups (preferably hydroxyl groups) necessary to allow the isocyanate groups of the crosslinking agent (I) to react completely at the latest during fixing.

Because NCO-functional crosslinking agents are capable of reacting with every possible Zerewitinoff-active hydrogen atom (not just hydroxyl groups), the polymers on which the binders are based need not contain hydroxyl groups.

Carboxyl, urethane, urea, amine, amide groups, and the like (see Saunders and Frisch, Polyurethanes, Part 1, Interscience Publishers, New York 1962, pages 63 et seq.) are also accessible to a crosslinking reaction. In the crosslinking reaction, it is generally not necessary—and in many cases not even desirable—to allow all the crosslinkable groups to react with isocyanates. In general, the crosslinking effect is merely phenomenologically determined. A certain resistance to water, abrasion, and the like are generally achieved with the above-mentioned 1 to 25 parts by weight of crosslinking agent per 100 parts by weight of binder without any significantly adverse affect on the elastic properties.

The binders to be used for the printing pastes are preferably free from perfluoroalkyl groups.

The crosslinking agents (II) to be used in accordance with the invention are known, for example, from German Offenlegungsschrift 3,512,918. Starting materials for the preparation of crosslinking agents (II) are (a) organic polyisocyanates having an (average) NCO functionality of 2.0 to 2.5 or mixtures of organic poly- and monoisocyanates having an average NCO functionality of 1.3 to 2.5 and, optionally, (b) compounds containing isocyanate-reactive groups and having a functionality of 1 or more in the context of the isocyanate addition reaction. Either or both of starting materials (a) and (b) can be compounds containing the sulfonate groups.

The synthesis components (a) include aliphatic, cycloaliphatic, araliphatic, aromatic or heterocyclic polyisocyanates (a1) of the type described, for example, by W. Siefken in *Justus Liebigs Annalen der Chemie*, 562, pages 75 to 136. Preferred polyisocyanates a1) of this type include, for example, the commercially readily obtainable diisocyanates, such as hexamethylene diisocyanate, 1-isocyanato-3,3,5 -trimethyl-5-isocyanatomethylcyclohexane and, preferably, aromatic diisocyanates, such as 2,4- and, optionally, 2,6-diisocyanatotoluene or 4,4'- and, optionally, 2,4'-diisocyanatodiphenylmethane, 3,4'-diisocyanato-4-methyldiphenylmethane, or 3,2'-diisocyanato-4-methyldiphenylmethane, and isomers thereof or mixtures of these diisocyanates. However, particularly preferred diisocyanates are phenylene diisocyanates sterically hindered by alkyl substituents, such as 1-methyl-3,5-diethyl-2,4-diisocyanatobenzene, 1-methyl-3,5 -diethyl-2,6-diisocyanatobenzene, and mixtures of these two diisocyanates, 1,3,5-triisopropyl-2,4-diisocyanatobenzene or alkyl-substituted phenylene diisocyanates of the type described by way of example in U.S. Pat. No. 3,05,845 or German Offenlegungsschrift 3,317,649.

Other starting materials (a) include, for example, hydrophilically modified polyisocyanates (a2). Suitable such polyisocyanates include both polyisocyanates containing sulfonate groups or groups convertible into sulfonate groups by a neutralization reaction, for example, of the type described in U.S. Pat. No. 3,959,329, and mono- or diisocyanates containing ethylene oxide units positioned within polyether chains of the type described in German OffenlegungsSchrtften 2,314,512, 2,314,513, 2,551,094, and 2 651 506, and U.S. Pat. Nos. 3,920,598 and 3,905,929. A sulfonated diisocyanate obtained by reaction of 2,4-diisocyanatotoluene with equimolar quantities of chlorosulfonic acid at room temperature in the presence of solvents such as 1,2-dichloroethane is also suitable as a compound containing groups convertible into sulfonate groups by reaction with neutralizing agents, such as triethylamine. Where compounds such as these are used as component (a2), neutralization is carried out after the reaction.

However, particularly preferred hydrophilically modified polyisocyanates are NCO prepolymers obtained by reaction of excess quantities of the diisocyanates mentioned by way of example under (a1) (especially the particularly preferred sterically hindered phenylene diisocyanates) with diols containing sulfonate groups. In the preparation of these NCO prepolymers, the starting materials are generally reacted at 20° to 150° C. in an NCO:OH equivalent ratio of 1.2:1 to 10:1. Diols containing sulfonate groups suitable for the preparation of the NCO prepolymers are preferably those corresponding to the following general formula:

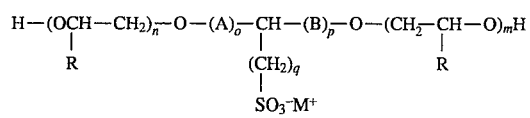

in which

A and B independently represent difunctional aliphatic hydrocarbon groups containing 1 to 6 carbon atoms, R represents hydrogen, an aliphatic hydrocarbon group containing 1 to 4 carbon atoms, or a phenyl group, $M^+$ represents an alkali metal cation or an optionally substituted ammonium group, n and m independently represent numbers of from 0 to 30, o and p independently have a value of 0 or 1, and q is an integer of from 0 to 2.

The preparation of these sulfonate diols is described, for example, in German Auslegeschrift 2,446,440 and U.S. Pat. No. 4,108,814. Particularly preferred sulfonate diols are those in which m and n may be the same or different and represent numbers of from 0 to 3.

Further starting materials (a) include, for example, organic monoisocyanates (a3), such as hexyl isocyanate, phenyl isocyanate, or p-toluene isocyanate. As mentioned above, however, these monoisocyanates are used in admixture with organic polyisocyanates of the type mentioned above by way of example, with the mixture having an average NCO functionality of 1.3 to 2.5 (preferably 1.3 to 2).

In addition, component (a) may also contain other modified polyisocyanates, such as reaction products of excess quantities of organic diisocyanates of the type mentioned by way of example under (a1) with di- or trihydroxyalkanes having a molecular weight below 400 (such as ethylene glycol, propylene glycol, tetramethylenediol, hexamethylenediol, trimethylol propane, and/or glycerol).

The optional synthesis components (b) for the preparation of crosslinking agents (II) include, for example, polyhydric (preferably dihydric) alcohols (b1) having a molecular weight below 400, such as ethylene glycol, propylene glycol, tetramethylenediol, hexamethylenediol, octamethylenediol, neopentyl glycol, 2-methyl-1,3-dihydroxypropane, glycerol, trimethylol propane, diethylene glycol, triethylene glycol, tetraethylene glycol, polyethylene glycols having molecular weights in the range mentioned above, dipropylene glycol, tripropylene glycol, or mixtures of these polyhydric alcohols.

Other optional synthesis components (b) include, for example, polyfunctional (preferably difunctional) amines (b2) having a molecular weight below 400 and containing at least two primary and/or secondary amino groups, such as 1,2-diaminoethane, hexamethylenediamine, piperazine, 1-amino-3-amino-methyl -3,5,5-trimethylcyclohexane, 4,4'-diaminodicyclohexyl methane, or mixtures of these amines. The use of amines such as these is, however, less preferred than hydroxyfunctional components (b).

Other optional synthesis components (b) include, for example, hydrophilically modified monohydric or dihydric alcohols (b3), such as the sulfonate diols mentioned by way of example above under (a2) or even compounds containing ethylene oxide units corresponding to the following general formula

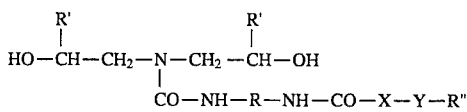

in which

R is a difunctional substituent of the type obtained by formal removal of the isocyanate groups from a diisocyanate $R(NCO)_2$ of the type mentioned above under (a1), R' represents hydrogen or a monofunctional hydrocarbon group containing 1 to 8 carbon atoms (preferably hydrogen or methyl), R" is a monofunctional hydrocarbon group containing 1 to 12 carbon atoms (preferably an unsubstituted alkyl group containing 1 to 4 carbon atoms), X is a polyalkylene oxide chain containing 5 to 90 (preferably 20 to 70) chain segments, of which at least 40% (preferably at least 65%) consist of ethylene oxide units and which, in addition to ethylene oxide units, may also contain propylene oxide, butylene oxide, or styrene oxide units (preferably propylene oxide units), and Y and Z independently represent oxygen or $—NR'''—$, where R''' has the same definition as R".

The crosslinking agent (II) corresponding to the above formulas can be prepared by the methods described in German Offenlegungsschriften 2,314,512 and 2,314,513. In addition to the disclosures of those documents, it is also possible to use, instead of the monofunctional polyether alcohols mentioned therein as starting material, monofunctional polyether alcohols in which the polyether segment may also contain up to 60% by weight, based on polyether segment, of propylene oxide, butylene oxide, or styrene oxide units (preferably propylene oxide units) in addition to ethylene oxide units. The presence of "mixed polyether segments" such as these can sometimes afford specific advantages.

The hydrophilic monohydric alcohols suitable for use in accordance with the invention include, for example, compounds corresponding to the following formula:

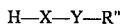

in which X, Y and R" have the definitions given above under (b3). These monohydric, hydrophilically modified alcohols can be prepared by the methods described in U.S. Pat. Nos. 3,905,929 or 3,920,538, for example, by alkoxylation of suitable starter molecules (such as butanol, for example) with ethylene oxide and, optionally, other alkylene oxides (such as propylene oxide, for example).

Other optional synthesis components (b) include, for example, aminosulfonates (b4), preferably diaminosulfonates of the type described in Canadian Patent 928,323, such as, preferably, the sodium salt of N-(2-aminoethyl)-2-aminoethanesulfonic acid.

Other optional starting components (b) include, for example, monohydric alcohols or monofunctional primary or secondary amines (b5) having a molecular weight below 400, including, for example, methanol, ethanol, butanol, i-butanol, octanol, or dodecanol and methyl amine, ethyl amine, hexyl amine, or aniline. These monohydric components are often used as chain-extending agents.

Other optional synthesis components (b) include hydrazine, hydrazine hydrate, or hydrazine derivatives, such as carboxylic acid hydrazides or semicarbazides. Ammonia may also be used as synthesis component (b) and acts as a particularly suitable chain terminator.

Preferred polyepoxides (III) are polyepoxides, such as bisglycidyl-2,2-diphenylpropane, triglycidyl urazole, and the like. The most preferred polyepoxide (III) is triglycidyl isocyanurate.

The foregoing observations in respect of the ratio of crosslinker (I) to binder also apply to the ratio of crosslinker (II) or crosslinker (III) to binder.

Crosslinking agents (I) are most particularly preferred.

The pigments suitable for the textile printing pastes are virtually free from limitations and can be inorganic or organic. Suitable organic pigments include, for example, those of the azo, anthraquinone, azoporphine, thioindigo, dioxazine, naphthalene tetracarboxylic acid, or perylene tetracarboxylic acid series, and lacquered dyes, such as calcium, magnesium, or aluminum lacquers of dyes containing sulfonic acid and/or carboxylic acid groups, of which a large number are known, for example, from Colour Index, 2nd Edition. Suitable inorganic pigments include, for example, zinc sulfides, titanium dioxides, ultramarines, iron oxides, nickel and chromium compounds, carbon blacks, silicon dioxides, and aluminum oxides.

The quantity of pigment used in the textile printing pastes is generally from 0.5 to 50% by weight (preferably from 5 to 35% by weight), based on the sum of binder, crosslinker, and pigment.

The binders and crosslinking agents can be dispersed as usual in water, optionally using organic solvents, for example, as in the so-called "petrol emulsion process", in which oil-in-water emulsions are formed. For reasons of ecological compatibility, however, it is preferred to use petrol-free printing pastes. In establishing the formulation, it is best to leave out components containing reactive groups that could interfere with the reaction between binder and crosslinking agent.

Other auxiliaries, such as emulsifiers, thickeners, evaporation inhibitors, catalysts, feel-promoting agents, antifoam agents, can, of course, be used in the preparation of the printing pastes.

The textile printing pastes can be processed by conventional printing techniques. See, for example, *Ullmanns Encyklopädie der technischen Chemie,* 4th Edition, Vol. 22, pages 565 et seq., "Textildruck", Verlag Chemie, Weinheim 1982.

The applied printings may be crosslinked at elevated temperatures. The crosslinking agents to be used in accordance with the invention enable relatively low temperatures (for example, in the range from 80° to 100° C.) to be applied, although higher temperatures of up to 170° C. are not harmful. In most cases, however, excellent results can be obtained using curing conditions of 80° to 100° C. for 1 to 10 minutes. Ultimate strength can also be achieved by drying for prolonged periods (e.g., 1 to 3 days) at room temperature.

In a particular embodiment of the invention these crosslinking agents can also be used together with binders and pigments for the dyeing of textiles in aqueous media. The wet and dry rub resistance is also improved by the use of the hydrophilicized isocyanates as crosslinking agents.

The following examples further illustrate details for this invention. The invention, which is set forth in the foregoing disclosure, is not to be limited either in spirit or scope by these example. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the examples:
Acrylate binder:
40% aqueous dispersion of an acrylonitrile/butyl acrylate/styrene/acrylic acid emulsion copolymer (4:83:8:3 parts)
Polyurethane binder:
40% aqueous dispersion of a polyurethane (a sulfonate groups containing polyester polyurethane based on hexamethylene diisocyanate; Acramin® PUD, Bayer AG, Germany)
Thickener solution:
4% aqueous solution of a cellulose derivative (Natrosol® MR, Hercules Powder)
Emulsifier L:
42% aqueous emulsifier solution (Emulgator L, Bayer AG, Germany)
Emulsifier VA:
46% aqueous emulsifier solution (F, mulgator VA, Bayer AG, Germany)
Emulsifier WN:
90% aqueous solution of an ethylene oxide polyether initiated with a phenolic component and having an average molecular weight of the order of 900 (F, mulgator WN, Bayer AG, Germany)
Acrylic acid/acrylamide copolymer dispersion:
29% dispersion of the ammonium salt of a weakly crosslinked hydrocarbon (Acraconz® BN, Bayer AG, Germany)
Acramin Navyblue FBC:
aqueous pigment formulation based on copper phthalocyanine (Acramin® Marineblau FBC, Bayer AG, Germany)
Solvesso 100: aromatic hydrocarbon mixture (bp 163°–181° C.) (Esso Chemie, Cologne, Germany)
Melamine/formaldehyde condensate: Acrafix® MF (Bayer AG, Germany)
Polyisocyanate 1
40 g of a 3-ethyl-3-hydroxymethyloxetane-initiated monofunctional ethylene oxide polyether (molecular weight 1210) were added with stirring to 500 g of a 1,6-diisocyanatohexane trimer consisting essentially of tris(6-isocyanatohexyl)isocyanurate and higher homologs thereof (NCO content 21.6%, average NCO functionality 3.3, monomeric diisocyanate content below 0.3%, viscosity mPa.s/23° C.). After the mixture was stirred for 2 hours at 100° C., a polyisocyanurate preparation having an NCO content of 19.7% by weight and a viscosity of 3200 mPa.s/23° C. was obtained. This preparation corresponds to the composition of Example 3 of European Patent Application 206,059.
Polyisocyanate 2
80.8 g of a butanol-initiated monofunctional ethylene oxide polyether (molecular weight 1145) heated to 50° C. were added with stirring to 1000 g of a 1,6-diisocyanatohexane trimer consisting essentially of tris(6-isocyanatohexyl)isocyanurate and higher homologs thereof (NCO content 21.6%, average functionality 3.3, monomeric diisocyanate content below 0.3%, viscosity 1700 mPa.s/23° C.). After the mixture was stirred for 2.5 hours at 110° C., a clear resin having an NCO content of 18.4% and a viscosity of 2500 mPa.s/23° C. is obtained.
Polyisocyanate 3

0.08 val (mol OH) of a methanol-initiated monofunctional ethylene oxide polyether (average molecular weight 350) were added with stirring at room temperature to 1.0 val (mol NCO) of an isocyanurate-modified polyisocyanate based on 1,6-diisocyanatohexane having an NCO content of 1.5%, an average NCO functionality of approximately 3.8 and a viscosity of 3000 mPa.s (23° C.), followed by heating for 3 hours to 100° C. A substantially colorless clear polyisocyanate mixture was obtained after cooling to room temperature and had an NCO content of 17.3%, a content of ethylene oxide units of 11.3%, and a viscosity of 3050 mPa.s (23° C.).
Polyisocyanate 4
1000 g of the isocyanurate of isophorone diisocyanate in the form of a 50% solution in a solvent mixture (methoxypropyl acetate/Solvesso 100 at a ratio of 1.6:1 parts by weight) were reacted with 50 g of 3-ethyl-2hydroxymethyloxetane polyglycol ether (molecular weight 1210) in the same way as for Polyisocyanate 1 to form a hydrophilicized isocyanate having an isocyanate content of 6.1%.
Comparison 1: Oil-in-water emulsion print
An emulsion was prepared from 225 g of water, 40 g of thickener solution, 25 g of a 33% aqueous solution of diammonium phosphate, 10 g of Emulsifier L, and 700 g of white spirit. 120 g acrylate binder, 30 g of Acramin Navyblue FBC, and 10 g of reelamine/formaldehyde condensate were then added to 840 g of the emulsion. A cotton fabric and a cotton/polyester fabric were then printed with the printing paste obtained (flat-bed printing). The print was fixed for 2 minutes at 80° C.
Internal testing method
Brush-washing test
Fixation of ACRAMIN dyeings can be checked by the brush-washing test, since there is not really any other way of determining the degree of crosslinking of the binder.
Take a specimen (approx. 10×20 cm) of the dyed fabric after curing and impregnate it with a solution of

| 2.5 | g/l | Marseille soap |
| 2 | g/l | soda ash calc. |
| 2 | g/l | sequestering agent | at 80° C. for approx. 10 minutes, stretch out and brush with a hard Perlon hand brush at constant pressure (1 kg). 50 double strokes are normally used.
Then rinse and dry the specimen. Compare the pigment abrasion of the brushed specimen with the fixed original dyeing. If no pigment abrasion is observed, crosslinking is complete.

EXAMPLE 1

The procedure of Comparison 1 was repeated except that 8 g of Polyisocyanate 1 was used instead of the melamine/formaldehyde condensate. Printing and fixing were carried out in the same way as in Comparison 1.
The prints of Comparison 1 and Example 1 were tested by the brush-washing test with the following results:

| Comparison I | Example 1 |
| --- | --- |
| Serious damage on both substrates | Very slight, barely noticeable damage on both substrates |

EXAMPLE 2

Printing from aqueous dispersion
Binder/thickener mixture: 5 g of Emulsifier VA, 4 g of Emulsifier WN, 25 g of acrylic acid/acrylamide copolymer (in the form of a 29% dispersion), 114 g of acrylate binder, and 50 g of carbon black were introduced into 802 g of water. The mixture was processed to colored pastes using three different quantities of each of the crosslinking agents (A)–(D) as listed in the following table:

|  | 1 | 2 | 3 |
|---|---|---|---|
| Binder/thickener mixture (as described above) | 995 g | 990 g | 985 g |
| (A) Melamine/formaldehyde condensate | 5 g | 10 g | 15 g |
| (B) Polyisocyanate 2 | 5 g | 10 g | 15 g |
| (C) Polyisocyanate 3, 80% in propylene glycol diacetate | 5 g | 10 g | 15 g |
| (D) Polyisocyanate 4 | 5 g | 10 g | 15 g |

The printing pastes were applied to mercerized cotton cloth and also to bleached cotton cloth. The prints were fixed (i) in air (i.e., simply left to dry), (ii) for 5 minutes at 80° C., and (iii) for 5 minutes at 80° C. and then for another 5 minutes at 150° C. To determine the fastness values, the brush-washing test (50 times) was carried out immediately after fixing, 3 days later and then 1 week later. To evaluate the stability of the printing pastes, printing tests were carried out with the same printing pastes 1 day after preparation of the pastes and 3 days after preparing of the pastes. The testing method is described above.

Where the prints were only "fixed" in air by evaporation of the water, the polyisocyanate used for test (C) was the most favorable insofar as the fastness values of the prints are concerned. However, after storage for 24 hours, the prints could no longer be fixed with these favorable fastness values. However, if new crosslinking agents were added, the original fastness values were again obtained. Test (D) provided equally good results only after 2 days' drying in air. However, drying at 80° C. brought this crosslinking agent to the high fastness level as quickly as (C). The polyisocyanate used for test (A) was not effective as a crosslinking agent up to 80° C. and showed the favorable fastness values only at 150° C.

The quantities of 10 and 15 g of crosslinking agent did not produce a significant increase in the fastness level. A quantity of only 5 g of crosslinking agent was sufficient for the fastness level achieved.

EXAMPLE 3

The printing pastes of Example 2 (A)–(C) were applied to woven and knitted cotton fabrics by rotary printing machine. The prints were fixed in the same way as in Example 2. Prints having good performance properties and good feel were obtained. The fixing conditions became apparent in the same way as in Example 2.

EXAMPLE 4

Example 2 was repeated except that 120 g of polyurethane binder were used instead of the acrylate binder and no pigment was used. 10 g of Polyisocyanate 1 was added as crosslinking agent to 990 g of this binder mixture. A light high-quality cotton was printed with this printing paste and the resultant printed textile was tested in a Fade-O-Meter. Resistance to yellowing and fastness to wet brush-washing were satisfactory.

EXAMPLE 5

The procedure of Example 3 was repeated except that the formaldehyde donor was replaced by 16 g of a 50% solution of triglycidyl urazole in diacetone alcohol.

Fixing after storage for 2 weeks at room temperature and after 5 minutes at 80° C. resulted, after the brush-washing test, in no sign of abrasion of the printing of the textile.

EXAMPLE 6

The procedure of Example 5 was repeated using 16 g of a 50% solution of 4,4'-diglycidyl-2,2-propane in diacetone alcohol. An improvement in brush-washing was again achieved by fixing at 80° C.

EXAMPLES 7 AND 8

Colored pastes were produced as in Example 1 using the binder/thickener mixture of Example 1.

| Example No. | 1 | 2 | 3 |
|---|---|---|---|
| Binder/thickener mixture (as described in Example 1) | 995 g | 990 g | 985 g |
| 7) Polycarbodiimide according to Example 1 of U.S. Pat.No. 4,977,219 with 9.8% carbodiimide groups in methoxypropyl acetate | 5 g | 10 g | 15 g |
| 8) Triglycidyl isocyanurate in the form of a 30% dispersion in diacetone alcohol | 5 g | 10 g | 15 g |

The printing pastes were applied as in Example 1 to mercerized cotton and to bleached cotton fabrics. The prints were fixed for 5 minutes at 80° C. and also for 5 minutes at 80° C. and then for another 5 minutes at 150° C. To determine the fastness values, brush-washing 50 times) was carried out immediately after fixing and also one week later.

Test Examples 7 and 8 give good results only at 80° C.; at 150° C., Examples 7 and 8 give slightly poorer fastness values than Example 1. In Example 8, the 10 g and 15 g quantities of crosslinking agent provided better results than 5 g.

What is claimed is:

1. A textile printing paste comprising a pigment, a binder, and a crosslinking agent, wherein said crosslinking agent consists essentially of
   (a) a polyisocyanate mixture prepared by reaction at an NCO:OH equivalent ratio of at least 2:1 of (A) a polyisocyanate component having an (average) NCO functionality of 2.1 to 4.4 in which at least one polyisocyanate of said polyisocyanate component contains only (cyclo)aliphatically bound isocyanate groups with (B) a polyalkylene oxide polyether alcohol containing a statistical average of 5 to 70 ethylene oxide units, wherein said polyisocyanate mixture (a) has
   (i) an average NCO functionality of 1.8 to 4.2,
   (ii) a content of (cyclo)aliphatically bound isocyanate groups (expressed as NCO, molecular weight 42) in the range from 12.0 to 21.5% by weight, and
   (iii) a content of ethylene oxide units (expressed as $C_2H_4O$, molecular weight 44) arranged within polyether chains of 2 to 20% by weight; or an isocyanate derivative prepared from an organic polyisocyanate having an (average) NCO functionality of 2.0 to 2.5 or a mixture of organic poly- and monoisocyanates having an average NCO functionality of 1.3 to 2.5 and, optionally, compounds containing isocyanate-reactive groups, wherein said isocyanate derivative contains (i) 2 to 30% by weight of carbodiimide groups —N=C=N—, with the statistical average being 0.8 to 30 —N=C=N— groups per molecule, (ii) 5 to 200 milliequivalents of chemically incorporated sulfonate groups per 100 g of isocyanate derivatives (II), and (iii) optionally, 0 to 25% by weight, based on isocyanate derivatives (II), of chemically incorporated ethylene oxide units —CH$_2$—CH$_2$—O— positioned within polyether chains; or (b) bisglycidyl-2,2-diphenylpropane or a polyepoxide containing at least three epoxide groups per molecule.

2. A method comprising printing a textile with textile printing paste according to claim 1.

3. A textile printing paste according to claim 1 comprising a pigment, a binder, and a crosslinking agent, wherein said crosslinking agent consists essentially of a polyisocyanate mixture prepared by reaction at an NCO:OH equivalent ratio of at least 2:1 of (A) a polyisocyanate component having an (average) NCO functionality of 2.1 to 4.4 in which at least one polyisocyanate of said polyisocyanate component contains only (cyclo)aliphatically bound isocyanate groups with (B) a polyalkylene oxide polyether alcohol containing a statistical average of 5 to 70 ethylene oxide units, wherein said polyisocyanate mixture has (i) an average NCO functionality of 1.8 to 4.2, (ii) a content of (cyclo)aliphatically bound isocyanate groups (expressed as NCO, molecular weight 42) in the range from 12.0 to 21.5% by weight, and (iii) a content of ethylene oxide units (expressed as $C_2H_4O$, molecular weight 44) arranged within polyether chains of 2 to 20% by weight.

* * * * *